United States Patent
Duffoo

[11] Patent Number: 5,899,414
[45] Date of Patent: May 4, 1999

[54] AIRCRAFT CRASH PREVENTION SYSTEM

[76] Inventor: Jose G. Duffoo, P.O. Box 340942, Brooklyn, N.Y. 11234

[21] Appl. No.: 08/906,116

[22] Filed: Jul. 25, 1997

[51] Int. Cl.$^6$ ................................................. B64D 17/80
[52] U.S. Cl. .................. 244/139; 244/129.2; 244/118.5; 169/60
[58] Field of Search .............................. 244/139, 147, 244/148, 149, 140, 141, 118.5, 121, 129.2; 340/691.1, 632, 637, 945, 577, 286.05; 348/143, 159; 169/60, 61, 62, 48

[56] References Cited

U.S. PATENT DOCUMENTS

| | | | |
|---|---|---|---|
| 4,298,177 | 11/1981 | Berlongieri | 244/139 |
| 4,480,807 | 11/1984 | Bowen | 244/139 |
| 4,552,325 | 11/1985 | Bruensicke | 244/129.2 |
| 4,811,793 | 3/1989 | Lokken | 244/129.2 |
| 4,816,828 | 3/1989 | Feher | 244/1 R |
| 4,866,439 | 9/1989 | Kraus | 244/1 R |
| 5,038,867 | 8/1991 | Hindrichs et al. | 244/129.2 |
| 5,382,943 | 1/1995 | Tanaka | 348/143 |

*Primary Examiner*—Galen L. Barefoot

[57] ABSTRACT

An aircraft rescue system is provided including a plurality of parachutes coupled to a tail of the aircraft, a midsection of the aircraft, and a nose of the aircraft. The parachutes are adapted to deploy upon the actuation thereof. A control mechanism is included for allowing a pilot to manually actuate the parachutes.

2 Claims, 3 Drawing Sheets

AIRCRAFT CRASH PREVENTION SYSTEM

BACKGROUND OF THE INVENTION

1. Field of the Invention

The present invention relates to air plane emergency systems and more particularly pertains to a new aircraft crash prevention system for preventing a fatal crash of an aircraft.

2. Description of the Prior Art

The use of air plane emergency systems is known in the prior art. More specifically, air plane emergency systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art air plane emergency systems include U.S. Pat. No. 4,351,394; U.S. Pat. No. 4,566,542; U.S. Pat. No. 4,347,901; U.S. Pat. No. 3,901,467; U.S. Pat. No. 4,082,148; and U.S. Pat. No. 3,865,192.

In these respects, the aircraft crash prevention system according to the present invention substantially departs from the conventional concepts and designs of the prior art, and in so doing provides an apparatus primarily developed for the purpose of preventing a fatal crash of an aircraft.

SUMMARY OF THE INVENTION

In view of the foregoing disadvantages inherent in the known types of air plane emergency systems now present in the prior art, the present invention provides a new aircraft crash prevention system construction wherein the same can be utilized for preventing a fatal crash of an aircraft.

The general purpose of the present invention, which will be described subsequently in greater detail, is to provide a new aircraft crash prevention system apparatus and method which has many of the advantages of the air plane emergency systems mentioned heretofore and many novel features that result in a new aircraft crash prevention system which is not anticipated, rendered obvious, suggested, or even implied by any of the prior art air plane emergency systems, either alone or in any combination thereof.

To attain this, the present invention generally comprises a plurality of video cameras situated within an aircraft. Such video cameras include a first video camera situated within an engine of a aircraft, a second video camera situated within a baggage storage area of the aircraft, a third video camera situated within a kitchen area of the aircraft, and a fourth video camera situated within a cabin area of the aircraft. Next provided are a plurality of smoke detectors each adapted to transmit an activation signal upon the detection of smoke. The smoke detectors include a first smoke detector situated within the engine of the aircraft, a second smoke detector situated within the baggage storage area of the aircraft, a third smoke detector situated within the kitchen area of the aircraft, and a fourth smoke detector situated within the cabin area of the aircraft. Also included is a plurality of temperature sensors each adapted to transmit an activation signal upon the detection of a temperature greater than a predetermined amount. The temperature sensors include a first temperature sensor situated within the engine of the aircraft, a second temperature sensor situated within the baggage storage area of the aircraft, a third temperature sensor situated within the kitchen area of the aircraft, and a fourth temperature sensor situated within the cabin area of the aircraft. Also included is a pair of video monitors positioned within a cockpit of the aircraft. Further provided is a first pair of multiplexers each with a plurality of inputs each connected to an associated one of the video cameras. Note FIG. 3. An output of the multiplexer is connected to an associated one of video monitors. In use, which camera is connected to the video monitor is determined via a selection input of the individual multiplexer. Also shown in FIG. 3 is a second pair of multiplexers including a first multiplexer connected to the smoke detectors for allowing the transmission of the activation signal to an output upon the receipt thereof. The smoke detector which is connected to the output of the first multiplexer is determined via a selection input thereof, similar to the previous multiplexers. The second pair of multiplexers further include a second multiplexer connected to the temperature sensors for allowing the transmission of the activation signal to an output upon the receipt thereof. In operation which temperature sensor is connected to the output of the second multiplexer is determined via a selection input thereof. Also included is an air speed detector for transmitting a safe speed signal upon the detection of a speed of the aircraft being below a predetermined speed. Next included is a plurality of parachutes coupled to a tail of the aircraft, a midsection of the aircraft, and a nose of the aircraft. The parachutes are adapted to deploy upon the actuation thereof. Yet another rescue mechanism is a floatation device situated on a bottom of the aircraft. The flotation device is adapted to inflate and deploy upon the actuation thereof. A plurality of ventilation fans are situated adjacent each of the smoke detectors and are adapted to circulate fresh air within the aircraft upon the actuation thereof. Finally, control means is connected between the selection inputs of the multiplexers, the outputs of the second pair of multiplexers, the air speed detector, the parachutes, the floatation device, and the ventilation fans. The method in which the control means dictates the operation of the remaining components of the present invention can be seen in FIG. 4. The control means is adapted to allow a pilot to manual select any of the two of the cameras to view on the video monitors. Further, the control means serves to automatically select one of the cameras situated adjacent one of the smoke detectors that transmits the activation signal. To expel the smoke, the control means further actuates the ventilation fans upon the receipt of the activation signal from any one of the smoke detectors. The control means further functions to automatically select one of the cameras situated adjacent one of the temperature sensors that transmits the activation signal. As such, the control means overrides the manual selection afforded by the pilot in favor of selecting a camera in an area of the aircraft where an anomaly is detected. Finally, the control means is further adapted to allow the manual actuation of the parachutes and the floatation device by the pilot only upon the receipt of the safe speed signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new aircraft crash prevention system apparatus and method which has many of the advantages of the air plane emergency systems mentioned heretofore and many novel features that result in a new aircraft crash prevention system which is not anticipated, rendered obvious, suggested, or even implied by any of the prior art air plane emergency systems, either alone or in any combination thereof.

It is another object of the present invention to provide a new aircraft crash prevention system which may be easily and efficiently manufactured and marketed.

It is a further object of the present invention to provide a new aircraft crash prevention system which is of a durable and reliable construction.

An even further object of the present invention is to provide a new aircraft crash prevention system which is susceptible of a low cost of manufacture with regard to both materials and labor, and which accordingly is then susceptible of low prices of sale to the consuming public, thereby making such aircraft crash prevention system economically available to the buying public.

Still yet another object of the present invention is to provide a new aircraft crash prevention system which provides in the apparatuses and methods of the prior art some of the advantages thereof, while simultaneously overcoming some of the disadvantages normally associated therewith.

Still another object of the present invention is to provide a new aircraft crash prevention system for preventing a fatal crash of an aircraft.

Even still another object of the present invention is to provide a new aircraft crash prevention system that includes a plurality of parachutes coupled to a tail of the aircraft, a midsection of the aircraft, and a nose of the aircraft. The parachutes are adapted to deploy upon the actuation thereof. A control mechanism is included for allowing a pilot to manually actuate the parachutes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
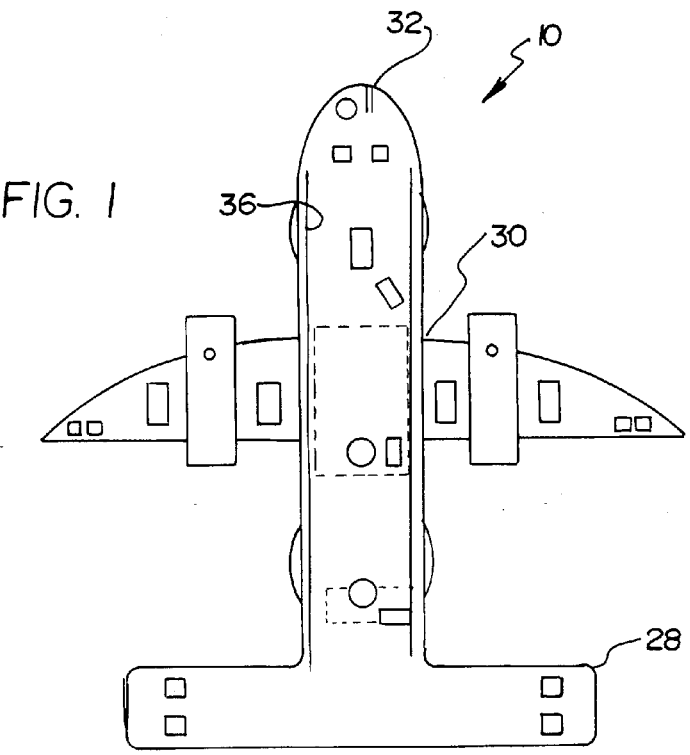
FIG. 1 is a bottom view of the aircraft of the present invention.
Figure 2:
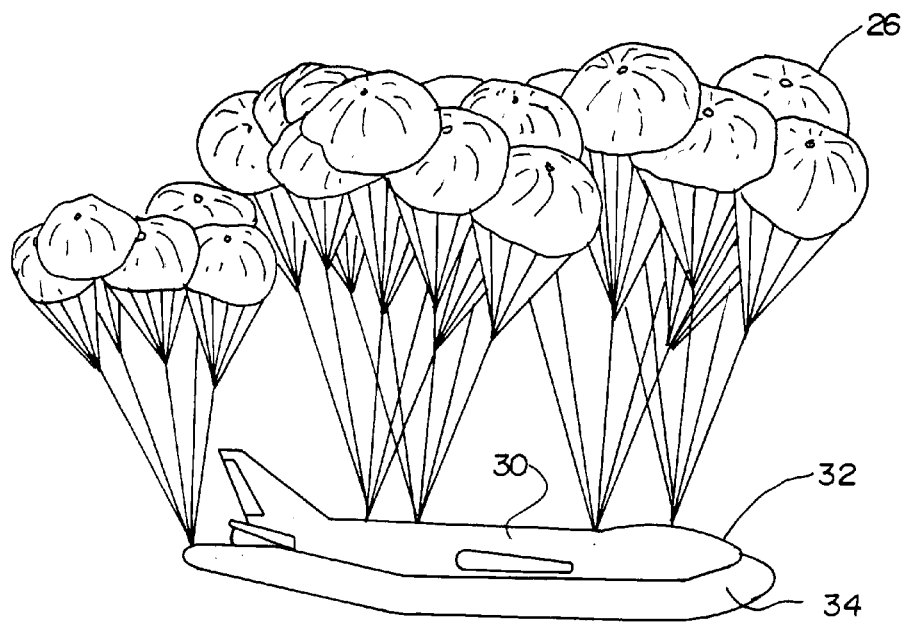
FIG. 2 is a side view of the aircraft with the floatation and parachutes thereof deployed.

With reference now to the drawings, a new aircraft crash prevention system embodying the principles and concepts of the present invention and generally designated by the reference numeral 10 will be described.

Specifically, the system 10 of the present invention includes a plurality of video cameras 12 situated within an aircraft. Such video cameras include a first video camera situated within an engine of a aircraft, a second video camera situated within a baggage storage area of the aircraft, a third video camera situated within a kitchen area of the aircraft, and a fourth video camera situated within a cabin area of the aircraft. As an option, an additional camera may be positioned adjacent the landing gear and brakes of the aircraft.

Next provided is a plurality of smoke detectors 14 each adapted to transmit an activation signal only during the detection of smoke. The smoke detectors include a first smoke detector situated within the engine of the aircraft, a second smoke detector situated within the baggage storage area of the aircraft, a third smoke detector situated within the kitchen area of the aircraft, and a fourth smoke detector situated within the cabin area of the aircraft.

Also included is a plurality of temperature sensors 16 each adapted to transmit an activation signal upon the detection of a temperature greater than a predetermined amount. The temperature sensors include a first temperature sensor situated within the engine of the aircraft, a second temperature sensor situated within the baggage storage area of the aircraft, a third temperature sensor situated within the kitchen area of the aircraft, and a fourth temperature sensor situated within the cabin area of the aircraft.

Also included is a pair of video monitors 18 positioned within a cockpit of the aircraft.

Further provided is a first pair of multiplexers 20 each with a plurality of inputs each connected to an associated one of the video cameras. Note FIG. 3. An output of the multiplexer is connected to an associated one of video monitors. In use, which camera is connected to the video monitor is determined via a selection input of the individual multiplexer.

Figure 3:
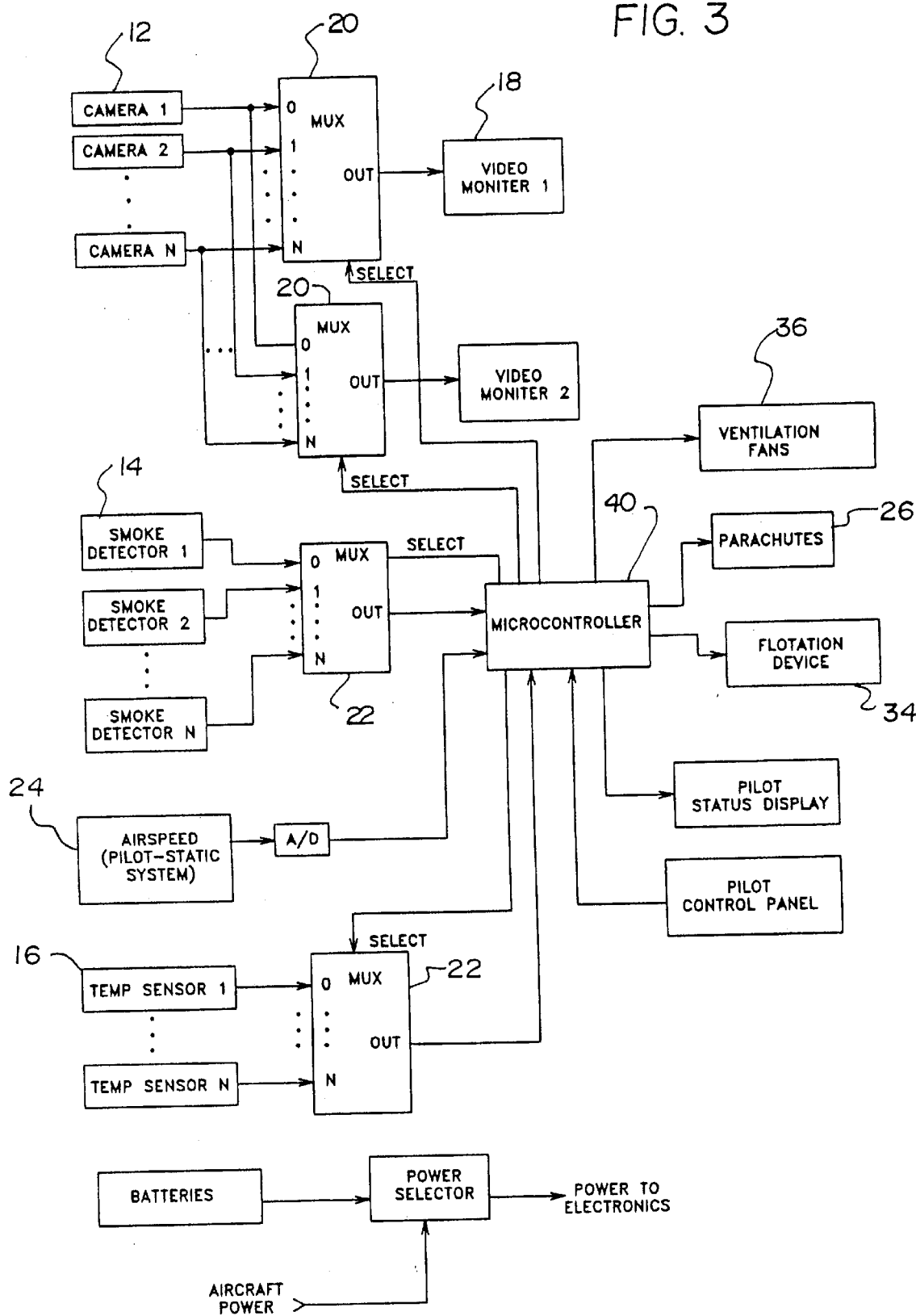
FIG. 3 is a schematic diagram of electrical components of the present invention.

Also shown in FIG. 3 is a second pair of multiplexers 22 including a first multiplexer connected to the smoke detectors for allowing the transmission of the activation signal to an output upon the receipt thereof. Which smoke detector is in communication with the output of the first multiplexer is determined via a selection input thereof, similar to the previous multiplexers. The second pair of multiplexers further include a second multiplexer connected to the temperature sensors for allowing the transmission of the activation signal to an output upon the receipt thereof. In operation, which temperature sensor is connected to the output of the second multiplexer is determined via a selection input thereof.

Also included is an air speed detector 24 for transmitting a safe speed signal upon the detection of a speed of the aircraft being below a predetermined speed.

Next included is a plurality of parachutes 26 coupled to a tail 28 of the aircraft, a midsection 30 of the aircraft, and a nose 32 of the aircraft. The parachutes are adapted to deploy upon the actuation thereof. Reserve parachutes may also be included in case the parachutes 26 fail to deploy. All of the parachutes are ideally equipped with a plurality of steel cables.

Yet another rescue mechanism is a floatation device 34 situated on a bottom of the aircraft. The flotation device is adapted to inflate and deploy upon the actuation thereof. Inflation is preferably afforded by way of a compressor. As shown in FIG. 1, the floatation device may be stored in chambers 36 situated along a length of the aircraft. When deployed, the floatation device preferably has a plurality of strobe lights positioned thereon that are actuated. Further, the floatation device ideally is of a fluorescent color.

A plurality of ventilation fans 36 are situated adjacent each of the smoke detectors and are adapted to circulate fresh air within the aircraft upon the actuation thereof. Associated with the ventilation fans is a plurality of fire extinguishers. Each fire extinguisher is adapted to expel fire extinguishing material when actuated.

Figure 4:
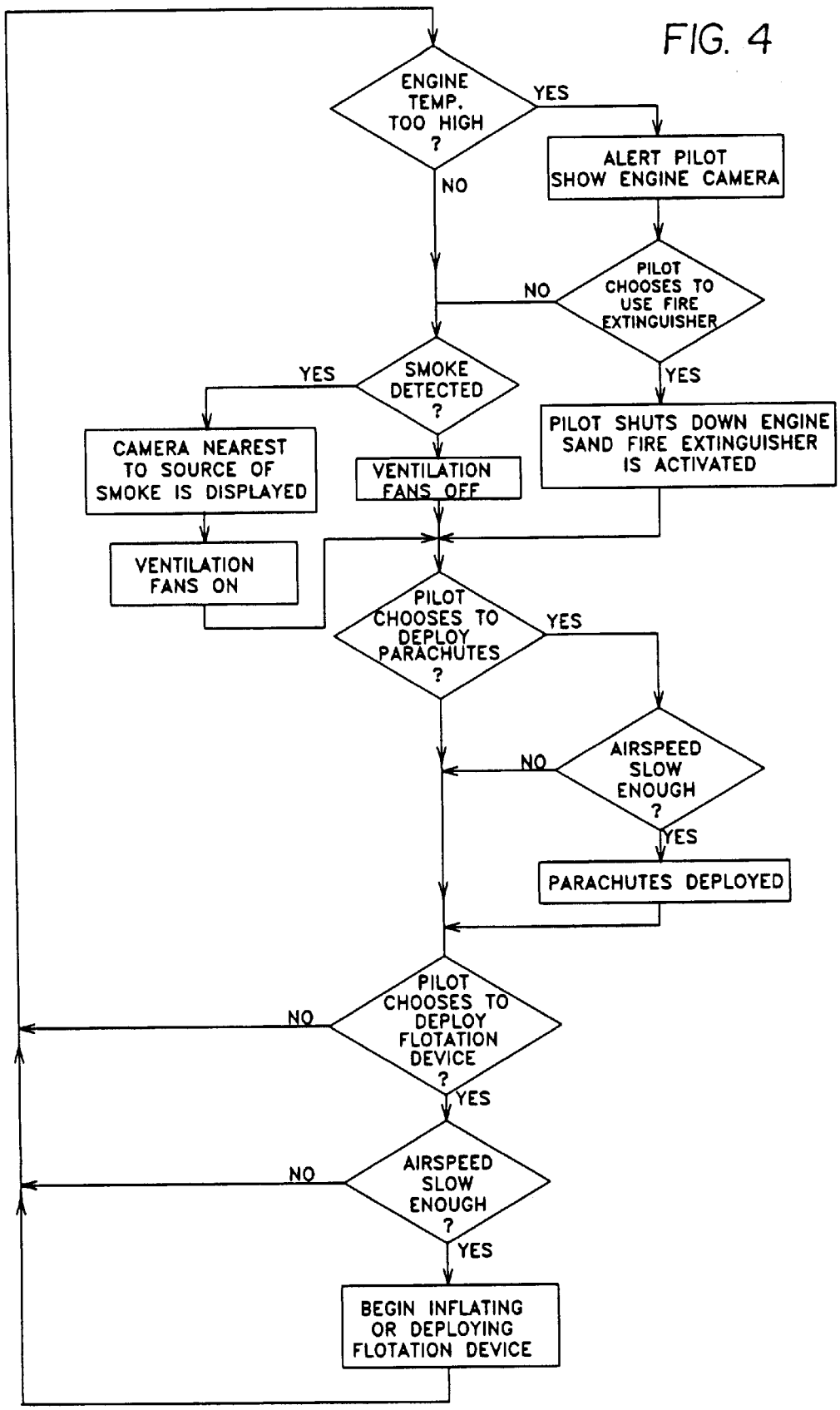
FIG. 4 is a flow chart depicting the operation of the present invention.

Finally, control means 40 is connected between the selection inputs of the multiplexers, the outputs of the second pair of multiplexers, the air speed detector, the parachutes, the floatation device, and the ventilation fans. The method in which the control means dictates the operation of the remaining components of the present invention can be seen in FIG. 4. The control means is adapted to allow a pilot to manual select any of the two of the cameras to view on the video monitors. Further, the control means serves to automatically select one of the cameras situated adjacent one of the smoke detectors that transmits the activation signal. To allow this to be accomplished, the activation signal has an identification header so that the control means may manipulate the selection input of the multiplexers accordingly. To expel the smoke, the control means further actuates the ventilation fans upon the receipt of the activation signal from any one of the smoke detectors. For extinguishing a fire associated with the smoke, the control means actuates one of fire extinguishers that is adjacent the smoke detector which has transmitted the activation signal. It should be noted that once the smoke signal is no longer received, all smoke extinguishing means are deactivated.

The control means further functions to automatically select one of the cameras situated adjacent one of the temperature sensors that transmits the activation signal. As such, the control means overrides the manual selection afforded by the pilot in favor of selecting a camera in an area of the aircraft where an anomaly is detected. Finally, the control means is further adapted to allow the manual actuation of the parachutes and the floatation device by the pilot only upon the receipt of the safe speed signal. In the alternative, the control means may be capable of automatic actuation of the parachutes and floatation device.

As shown in FIG. 3, a control panel is included to provide a visual and audio indication that an activation signal has been received. The control panel is also adapted to indicate which component has transmitted the activation signal.

For providing a reliable power supply, a plurality of batteries are preferably connected to the control means. As an option, all of the components of the present invention may be equipped with a battery for back-up powering purposes. Ideally, during the operation of the present invention, the "black box" of the air craft is continuously functioning and recording the transmission and receipt of the various signals by the control means.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An aircraft rescue system comprising, in combination: an aircraft:

a plurality of video cameras including a first video camera situated within an engine of the aircraft, a second video camera situated within a baggage storage area of the aircraft, a third video camera situated within a kitchen area of the aircraft, and a fourth video camera situated within a cabin area of the aircraft;

a plurality of smoke detectors each adapted to transmit an activation signal upon the detection of smoke, the smoke detectors including a first smoke detector situated within the engine of the aircraft, a second smoke detector situated within the baggage storage area of the aircraft, a third smoke detector situated within the kitchen area of the aircraft, and a fourth smoke detector situated within the cabin area of the aircraft;

a plurality of temperature sensors each adapted to transmit an activation signal upon the detection of a temperature greater than a predetermined amount, the temperature sensors including a first temperature sensor situated within the engine of the aircraft, a second temperature sensor situated within the baggage storage area of the aircraft, a third temperature sensor situated within the kitchen area of the aircraft, and a fourth temperature sensor situated within the cabin area of the aircraft;

a pair of video monitors positioned within a cockpit of the aircraft;

a first pair of multiplexers each with a plurality of inputs each connected to an associated one of the video cameras and an output connected to an associated one of video monitors, whereby which camera is connected to the video monitor is determined via a selection input thereof;

a second pair of multiplexers including a first multiplexer connected to the smoke detectors for allowing the transmission of the activation signal to an output upon the receipt thereof, whereby which smoke detector is connected to the output of the first multiplexer is determined via a selection input thereof and a second multiplexer connected to the temperature sensors for allowing the transmission of the activation signal to an output upon the receipt thereof, whereby which temperature sensor is connected to the output of the second multiplexer is determined via a selection input thereof;

an air speed detector for transmitting a safe speed signal upon the detection of a speed of the aircraft being below a predetermined speed;

a plurality of parachutes coupled to a tail of the aircraft, a midsection of the aircraft, and a nose of the aircraft, the parachutes adapted to deploy upon the actuation thereof;

a floatation device situated on a bottom of the aircraft, the flotation device adapted to deploy upon the actuation thereof;

a plurality of ventilation fans situated adjacent each of the smoke detectors and adapted to circulate fresh air within the aircraft upon the actuation thereof; and control means connected to the selection inputs of the multiplexers, the outputs of the second pair of multiplexers, the air speed detector, the parachutes, the floatation device, and the ventilation fans, the control means adapted to allow a pilot to manual select any of the two of the cameras to view on the video monitors, to automatically select one of the cameras situated adjacent one of the smoke detectors that transmits the activation signal and further actuate the ventilation fans upon the receipt of the activation signal from one of the smoke detectors, to automatically select one of the cameras situated adjacent one of the temperature sensors that transmits the activation signal, and to allow the manual actuation of the parachutes and the floatation device by the pilot only upon the receipt of the safe speed signal.

2. An aircraft rescue system comprising:

an aircraft:

at least one video camera situated within the aircraft;

at least one smoke detector adapted to transmit an activation signal upon the detection of smoke, the smoke detectors being situated within the aircraft;

at least one temperature sensor adapted to transmit an activation signal upon the detection of a temperature greater than a predetermined amount, the temperature sensor being situated within the aircraft;

at least one video monitor positioned within a cockpit of the aircraft;

an air speed detector for transmitting a safe speed signal upon the detection of a speed of the aircraft being below a predetermined speed;

a plurality of parachutes coupled to a tail of the aircraft, a midsection of the aircraft, and a nose of the aircraft, the parachutes adapted to deploy upon the actuation thereof;

a floatation device situated on a bottom of the aircraft, the flotation device adapted to deploy upon the actuation thereof;

control means connected to the air speed detector, the parachutes, and the floatation device, the control means adapted to allow the manual actuation of the parachutes and the floatation device by the pilot only upon the receipt of the safe speed signal and;

a plurality of ventilation fans situated adjacent to the smoke detector and adapted to circulate fresh air within the aircraft upon the detection of smoke.

* * * * *